(12) United States Patent
Huang et al.

(10) Patent No.: US 11,610,607 B1
(45) Date of Patent: Mar. 21, 2023

(54) VIDEO HIGHLIGHTS WITH USER VIEWING, POSTING, SENDING AND EXPORTING

(71) Applicants: Justin Huang, Los Angeles, CA (US); David Ben Haim, Haifa (IL); Nathan Litke, Redondo Beach, CA (US); Eyal Zak, Megiddo (IL)

(72) Inventors: Justin Huang, Los Angeles, CA (US); David Ben Haim, Haifa (IL); Nathan Litke, Redondo Beach, CA (US); Eyal Zak, Megiddo (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/724,812

(22) Filed: Dec. 23, 2019

(51) Int. Cl.
*G11B 27/031* (2006.01)
*G06V 20/40* (2022.01)

(52) U.S. Cl.
CPC ........... *G11B 27/031* (2013.01); *G06V 20/47* (2022.01)

(58) Field of Classification Search
CPC . G11B 27/031; G11B 27/034; G11B 2220/90; G11B 27/34; G11B 27/105; G06K 9/00751; H04N 9/8042
USPC ......................................................... 386/278
See application file for complete search history.

(56) References Cited

U.S. PATENT DOCUMENTS

| | | | |
|---|---|---|---|
| 2004/0071441 A1 | 4/2004 | Foreman et al. | |
| 2009/0022472 A1* | 1/2009 | Bronstein | G11B 27/329 |
| | | | 386/278 |
| 2010/0287473 A1 | 11/2010 | Recesso et al. | |
| 2011/0066940 A1 | 3/2011 | Kamrani et al. | |
| 2012/0324491 A1 | 12/2012 | Bathiche et al. | |
| 2014/0341527 A1 | 11/2014 | Hurley et al. | |
| 2015/0134673 A1 | 5/2015 | Golan et al. | |
| 2015/0312341 A1* | 10/2015 | Smith | G06F 16/739 |
| | | | 709/213 |
| 2016/0014482 A1 | 1/2016 | Chen et al. | |
| 2016/0029105 A1* | 1/2016 | Newman | G11B 27/002 |
| | | | 386/281 |
| 2016/0092561 A1* | 3/2016 | Liu | G06F 16/739 |
| | | | 386/230 |
| 2016/0292510 A1 | 10/2016 | Han et al. | |

(Continued)

OTHER PUBLICATIONS

U.S. Appl. No. 16/730,872, dated Dec. 30, 2019, David Ben Haim.
U.S. Appl. No. 16/718,395, dated Dec. 18, 2019, David Ben Haim.
U.S. Appl. No. 16/724,812, dated Dec. 23, 2019, Justin Huang.

*Primary Examiner* — Thai Q Tran
*Assistant Examiner* — Nienru Yang
(74) *Attorney, Agent, or Firm* — Culhane Meadows PLLC; Stephen J. Weed

(57) ABSTRACT

A server configured to receive video clips from a mobile device, such as eyewear. The server has an electronic processor enabled to execute computer instructions to process the video clips to identify one or more characteristics in the frames of the video clips. The processor selects the video clips having the identified characteristics in the frames and creates a set of the selected video clips having the identified characteristics in the frames. The processor automatically trims, or allows a user of the mobile device to edit and trim the video clips having the identified characteristics to create trimmed video clip segments. The processor enables a user of the mobile device to view, post, send, and export a selected said video clip segment to another user.

20 Claims, 15 Drawing Sheets

(56) References Cited

U.S. PATENT DOCUMENTS

| | | | |
|---|---|---|---|
| 2016/0381419 A1* | 12/2016 | Zhang | H04N 21/4223 725/14 |
| 2017/0068870 A1* | 3/2017 | Lindholm | G06F 16/9038 |
| 2017/0076571 A1 | 3/2017 | Borel et al. | |
| 2017/0257595 A1 | 9/2017 | Newell et al. | |
| 2017/0262697 A1* | 9/2017 | Kaps | G11B 27/022 |
| 2018/0167698 A1 | 6/2018 | Mercer et al. | |
| 2018/0232705 A1 | 8/2018 | Baker et al. | |
| 2019/0114487 A1 | 4/2019 | Vijayanarasimhan et al. | |
| 2019/0354766 A1 | 11/2019 | Moore et al. | |

\* cited by examiner

VIDEO HIGHLIGHTS WITH USER VIEWING, POSTING, SENDING AND EXPORTING

TECHNICAL FIELD

The present subject matter relates to an eyewear device, e.g., smart glasses.

BACKGROUND

Portable eyewear devices, such as smart glasses, headwear, and headgear available today integrate cameras and see-through displays. These eyewear devices record video segments, which may be shared with others.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
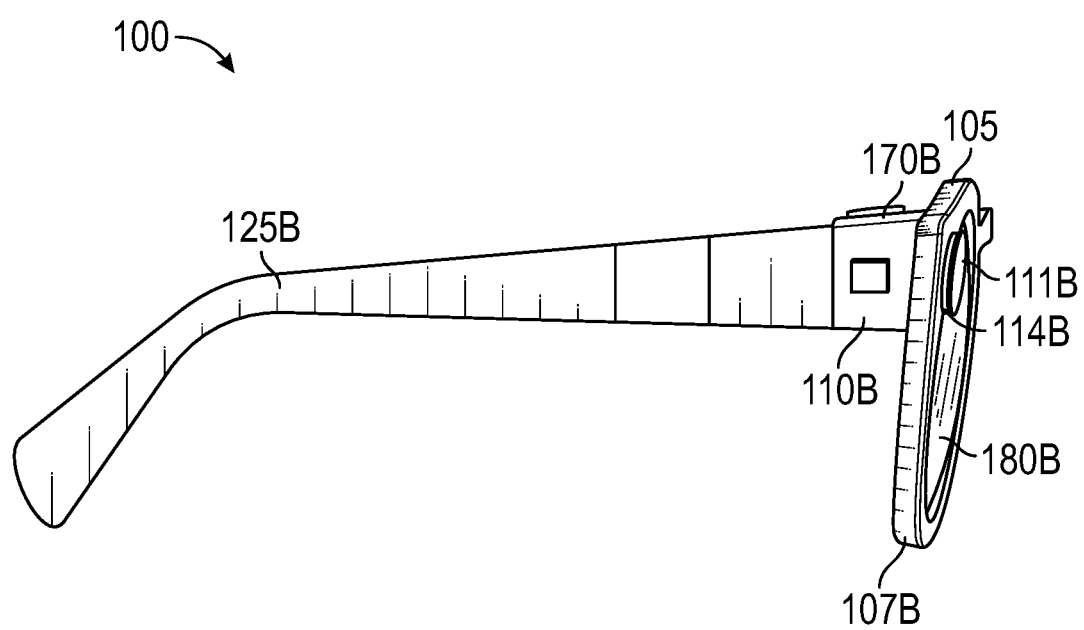
FIG. 1A is a side view of an example hardware configuration of an eyewear device, which shows a right optical assembly with an image display, and field of view adjustments are applied to a user interface presented on the image display based on detected head or eye movement by a user.

In an example, video highlights (stories) are automatically generated at the end of each day. The system looks at each image taken during the day (or a subset thereof) and selects the best portions (highlights), e.g., based on similarity and time bucketing. This may be performed with a server configured to receive video clips from a mobile device, such as eyewear. The server has an electronic processor enabled to execute computer instructions to process the video clips to identify one or more characteristics in the frames of the video clips. The processor selects the video clips having the identified characteristics in the frames and creates a set of the selected video clips having the identified characteristics in the frames. The processor automatically trims the video clips based on frames that have the identified characteristics to create trimmed video clip segments, and then sends the trimmed video clip segments to the mobile device. The processor enables a user of the mobile device to view, post, send, and export a selected video clip segments to another user.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

FIG. 1A is a side view of an example hardware configuration of an eyewear device 100, which includes a right optical assembly 180B. Eyewear device 100 includes multiple visible light cameras 114A-B (FIG. 7) that form a stereo camera, of which the right visible light camera 114B is located on a right temple 110B.

The left and right visible light cameras 114A-B have an image sensor that is sensitive to the visible light range wavelength. Each of the visible light cameras 114A-B have a different frontward facing angle of coverage, for example, visible light camera 114B has the depicted angle of coverage 111B. The angle of coverage is an angle range which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light camera 114A-B and process those signals from the visible light cameras 114A-B into a format suitable for storage in the memory (element 934 of FIG. 9). The timestamp can be added by the image processor 912 or other processor, which controls operation of the visible light cameras 114A-B. Visible light cameras 114A-B allow the stereo camera to simulate human binocular vision. Stereo cameras provide the ability to reproduce three-dimensional images (element 715 of FIG. 7) based on two captured images (elements 758A-B of FIG. 7) from the visible light cameras 114A-B, respectively, having the same timestamp. Such three-dimensional images 715 allow for an immersive life-like experience, e.g., for virtual reality or video gaming. For stereoscopic vision, the pair of images 758A-B are generated at a given moment in time—one image for each of the left and right visible light cameras 114A-B. When the pair of generated images 758A-B from the frontward facing angles of coverage 111A-B of the left and right visible light cameras 114A-B are stitched together (e.g., by the image processor 912), depth perception is provided by the optical assembly 180A-B.

In an example, a user interface field of view adjustment system includes the eyewear device 100. The eyewear device 100 includes a frame 105, a right temple 110B extending from a right lateral side 170B of the frame 105, and a see-through image display comprising optical assemblies 180A and 180B to present a graphical user interface to a user. The eyewear device 100 includes the left visible light camera 114A connected to the frame 105 or the left temple 110A to capture a first image of the scene. Eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, the user interface field of view adjustment system further includes the processor 932 coupled to the eyewear device 100 and connected to the visible light cameras 114A-B, the memory 934 accessible to the processor 932, and programming in the memory 934, for example in the eyewear device 100 itself or another part of the user interface field of view adjustment system.

Figure 2A:
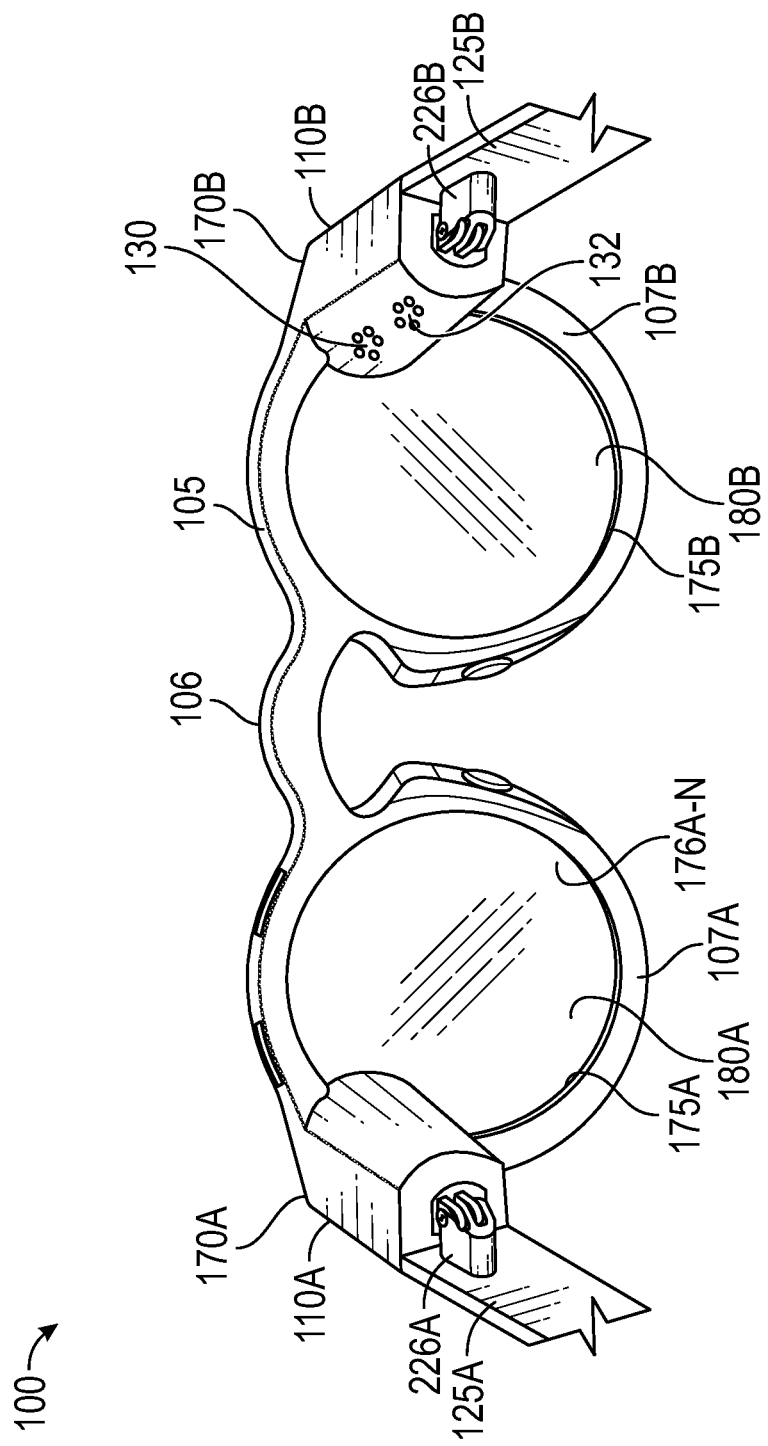
FIG. 2A is a rear view of an example hardware configuration of an eyewear device, which includes an eye scanner on a frame, for use in a system for identifying a user of the eyewear device.
Figure 2B:
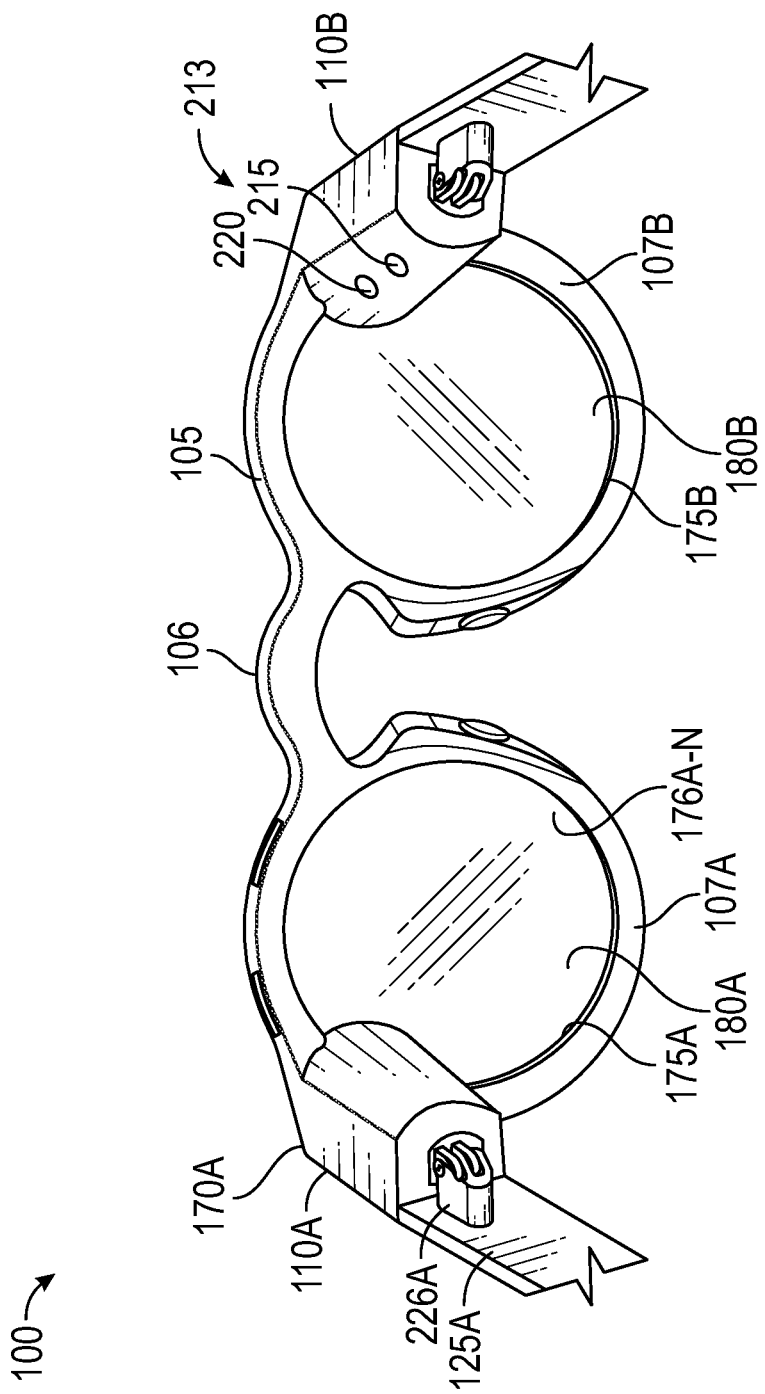
FIG. 2B is a rear view of an example hardware configuration of another eyewear device, which includes an eye scanner on a temple, for use in a system for identifying a user of the eyewear device.

Although not shown in FIG. 1A, the eyewear device 100 also includes a head movement tracker or an eye movement tracker (element 213 of FIG. 2B). Eyewear device 100 further includes the see-through image displays of optical assembly 180A-B for presenting a sequence of displayed images, and an image display driver (element 942 of FIG. 9) coupled to the see-through image displays of optical assembly 180A-B to control the image displays of optical assembly 180A-B to present the sequence of displayed images 715, which are described in further detail below. Eyewear device 100 further includes the memory 934 and the processor 932 having access to the image display driver 942 and the memory 934. Eyewear device 100 further includes programming (element 934 of FIG. 9) in the memory. Execution of the programming by the processor 932 configures the eyewear device 100 to perform functions, including functions to present, via the see-through image displays, an initial displayed image of the sequence of displayed images, the initial displayed image having an initial field of view corresponding to an initial head direction or an initial eye gaze direction (element 230 of FIG. 5).

Execution of the programming by the processor 932 further configures the eyewear device 100 to detect movement of a user of the eyewear device by: (i) tracking, via a head movement tracker, a head movement of a head of the user, or (ii) tracking, via an eye movement tracker (element 213 of FIG. 2B and FIG. 5), an eye movement of an eye of the user of the eyewear device 100. Execution of the programming by the processor 932 further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor 932 further configures the eyewear device 100 to generate a successive displayed image of the sequence of displayed images based on the field of view adjustment. Execution of the programming by the processor 932 further configures the eyewear device 100 to present, via the see-through image displays of the optical assembly 180A-B, the successive displayed images.

Figure 1B:
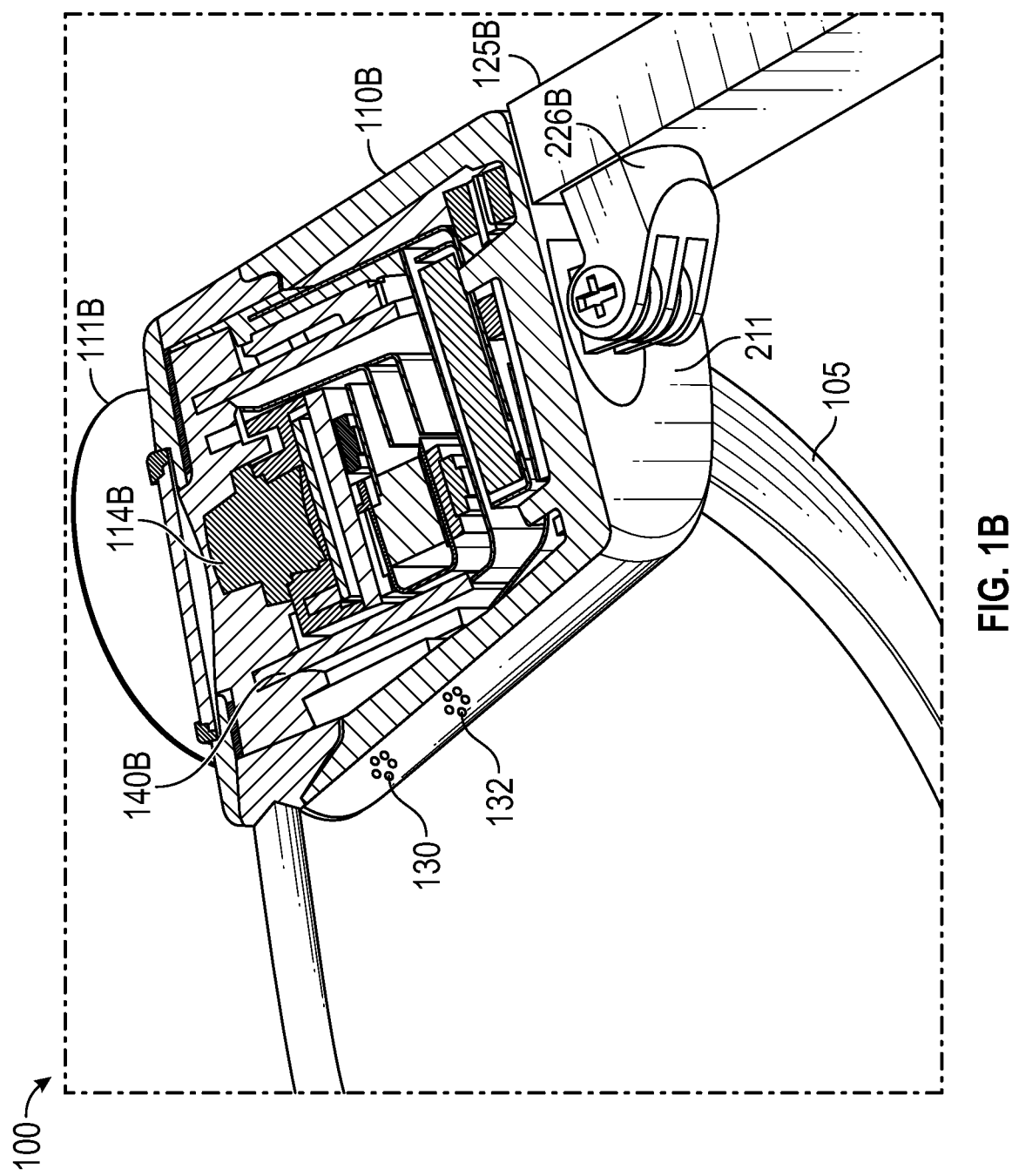
FIG. 1B is a top cross-sectional view of a temple of the eyewear device of FIG. 1A depicting a visible light camera, a head movement tracker for tracking the head movement of the user of the eyewear device, and a circuit board.

FIG. 1B is a top cross-sectional view of the temple of the eyewear device 100 of FIG. 1A depicting the right visible light camera 114B, a head movement tracker 109, and a circuit board 140B. Construction and placement of the left visible light camera 114A is substantially similar to the right visible light camera 114B, except the connections and coupling are on the left lateral side 170A. As shown, the eyewear device 100 includes the right visible light camera 114B and a circuit board, which may be a flexible printed circuit board (PCB) 140B. The right hinge 226B connects the right temple 110B to a right temple 125B of the eyewear device 100. In some examples, components of the right visible light camera 114B, the flexible PCB 140B, or other electrical connectors or contacts may be located on the right temple 125B or the right hinge 226B.

Eyewear device 100 has a head movement tracker which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass which generates a heading reference. The three accelerometers to detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker, the head movement of the head of the user. The head movement includes a variation of head direction on a horizontal axis, a vertical axis, or a combination thereof from the initial head direction during presentation of the initial displayed image on the image display. In one example, tracking, via the head movement tracker, the head movement of the head of the user includes measuring, via the inertial measurement unit, the initial head direction on the horizontal axis (e.g., X axis), the vertical axis (e.g., Y axis), or the combination thereof (e.g., transverse or diagonal movement). Tracking, via the head movement tracker, the head movement of the head of the user further includes measuring, via the inertial measurement unit, a successive head direction on the horizontal axis, the vertical axis, or the combination thereof during presentation of the initial displayed image.

Tracking, via the head movement tracker, the head movement of the head of the user further includes determining the variation of head direction based on both the initial head direction and the successive head direction. Detecting movement of the user of the eyewear device 100 further includes in response to tracking, via the head movement tracker, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means±10% from the stated amount.

Variation along the horizontal axis slides three-dimensional objects, such as characters, bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The right temple 110B includes temple body 211 and a temple cap, with the temple cap omitted in the cross-section of FIG. 1B. Disposed inside the right temple 110B are various interconnected circuit boards, such as PCBs or flexible PCBs, that include controller circuits for right visible light camera 114B, microphone(s) 130, speaker(s) 132, low-power wireless circuitry (e.g., for wireless short-range network communication via Bluetooth™), high-speed wireless circuitry (e.g., for wireless local area network communication via WiFi).

The right visible light camera 114B is coupled to or disposed on the flexible PCB 140B and covered by a visible light camera cover lens, which is aimed through opening(s) formed in the right temple 110B. In some examples, the frame 105 connected to the right temple 110B includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing angle of coverage 111B with a line of sight or perspective of the right eye of the user of the eyewear device 100. The visible light camera cover lens can also be adhered to an outward facing surface of the right temple 110B in which an opening is formed with an outwards facing angle of coverage, but in a different outwards direction. The coupling can also be indirect via intervening components.

Left (first) visible light camera 114A is connected to the left see-through image display of left optical assembly 180A to generate a first background scene of a first successive displayed image. The right (second) visible light camera 114B is connected to the right see-through image display of right optical assembly 180B to generate a second background scene of a second successive displayed image. The first background scene and the second background scene partially overlap to present a three-dimensional observable area of the successive displayed image.

Flexible PCB 140B is disposed inside the right temple 110B and is coupled to one or more other components housed in the right temple 110B. Although shown as being formed on the circuit boards of the right temple 110B, the right visible light camera 114B can be formed on the circuit boards of the left temple 110A, the temples 125A-B, or frame 105.

FIG. 2B is a rear view of an example hardware configuration of an eyewear device 100, which includes an eye scanner 213 on a frame 105, for use in a system for determining an eye position and gaze direction of a wearer/user of the eyewear device 100. As shown in FIG. 2B, the eyewear device 100 is in a form configured for wearing by a user, which are eyeglasses in the example of FIG. 2B. The eyewear device 100 can take other forms and may incorporate other types of frameworks, for example, a headgear, a headset, or a helmet.

In the eyeglasses example, eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into temples (not shown) attached to the frame 105.

In the example of FIG. 2B, the eye scanner 213 includes an infrared emitter 215 and an infrared camera 220. Visible light cameras typically include a blue light filter to block infrared light detection, in an example, the infrared camera 220 is a visible light camera, such as a low-resolution video graphic array (VGA) camera (e.g., 640×480 pixels for a total of 0.3 megapixels), with the blue filter removed. The infrared emitter 215 and the infrared camera 220 may be co-located on the frame 105 or located on the right temple 110B as shown in FIG. 2B, for example. The frame 105 or one or more of the left and right temples 110A-B include a circuit board (not shown) that includes the infrared emitter 215 and the infrared camera 220. The infrared emitter 215 and the infrared camera 220 can be connected to the circuit board 140B by soldering, for example.

Other arrangements of the infrared emitter 215 and infrared camera 220 can be implemented, including arrangements in which the infrared emitter 215 and infrared camera 220 are both on the right rim 107B, or in different locations on the frame 105, for example, the infrared emitter 215 is on the left rim 107A and the infrared camera 220 is on the right rim 107B. In another example, the infrared emitter 215 is on the frame 105 and the infrared camera 220 is on one of the temples 110A-B, or vice versa. The infrared emitter 215 can be connected essentially anywhere on the frame 105, left temple 110A, or right temple 110B to emit a pattern of infrared light. Similarly, the infrared camera 220 can be connected essentially anywhere on the frame 105, left temple 110A, or right temple 110B to capture at least one reflection variation in the emitted pattern of infrared light.

The infrared emitter 215 and infrared camera 220 are arranged to face inwards towards an eye of the user with a partial or full field of view of the eye in order to identify the respective eye position and gaze direction. For example, the infrared emitter 215 and infrared camera 220 are positioned directly in front of the eye, in the upper part of the frame 105 or in the temples 110A-B at either ends of the frame 105.

FIG. 2B is a rear view of an example hardware configuration of another eyewear device 100. In this example configuration, the eyewear device 100 is depicted as including an eye scanner 213 on a right temple 110B. As shown, an infrared emitter 215 and an infrared camera 220 are co-located on the right temple 110B. It should be understood that the eye scanner 213 or one or more components of the eye scanner 213 can be located on the left temple 110A and other locations of the eyewear device 100, for example, the frame 105. The infrared emitter 215 and infrared camera 220 are like that described above, but the eye scanner 213 can be varied to be sensitive to different light wavelengths.

Similar to FIG. 2A, the eyewear device 100 includes a frame 105 which includes a left rim 107A which is connected to a right rim 107B via a bridge 106; and the left and right rims 107A-B include respective apertures which hold the respective optical elements 180A-B comprising the see-through display.

Figure 2C:
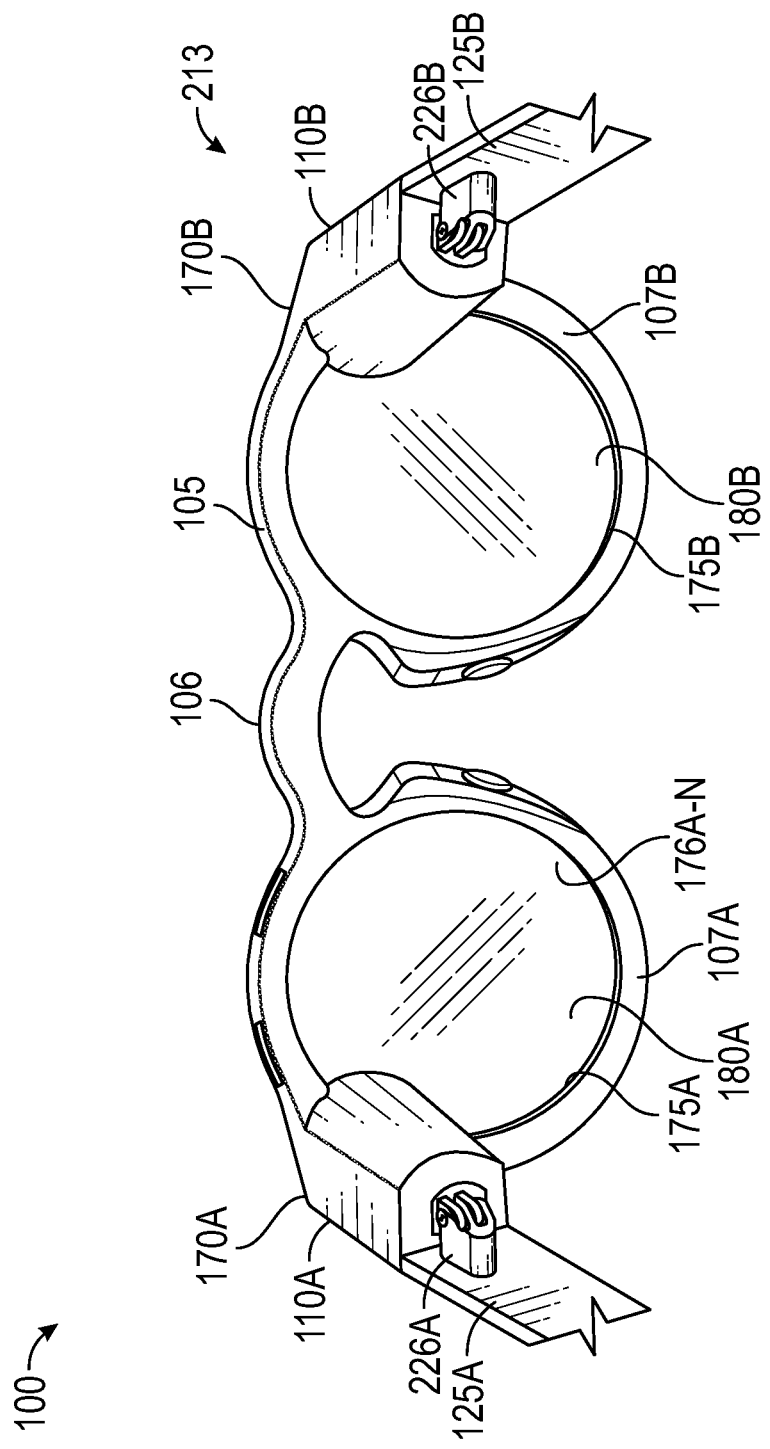
FIGS. 2C and 2D are rear views of example hardware configurations of the eyewear device, including two different types of image displays.
Figure 2D:
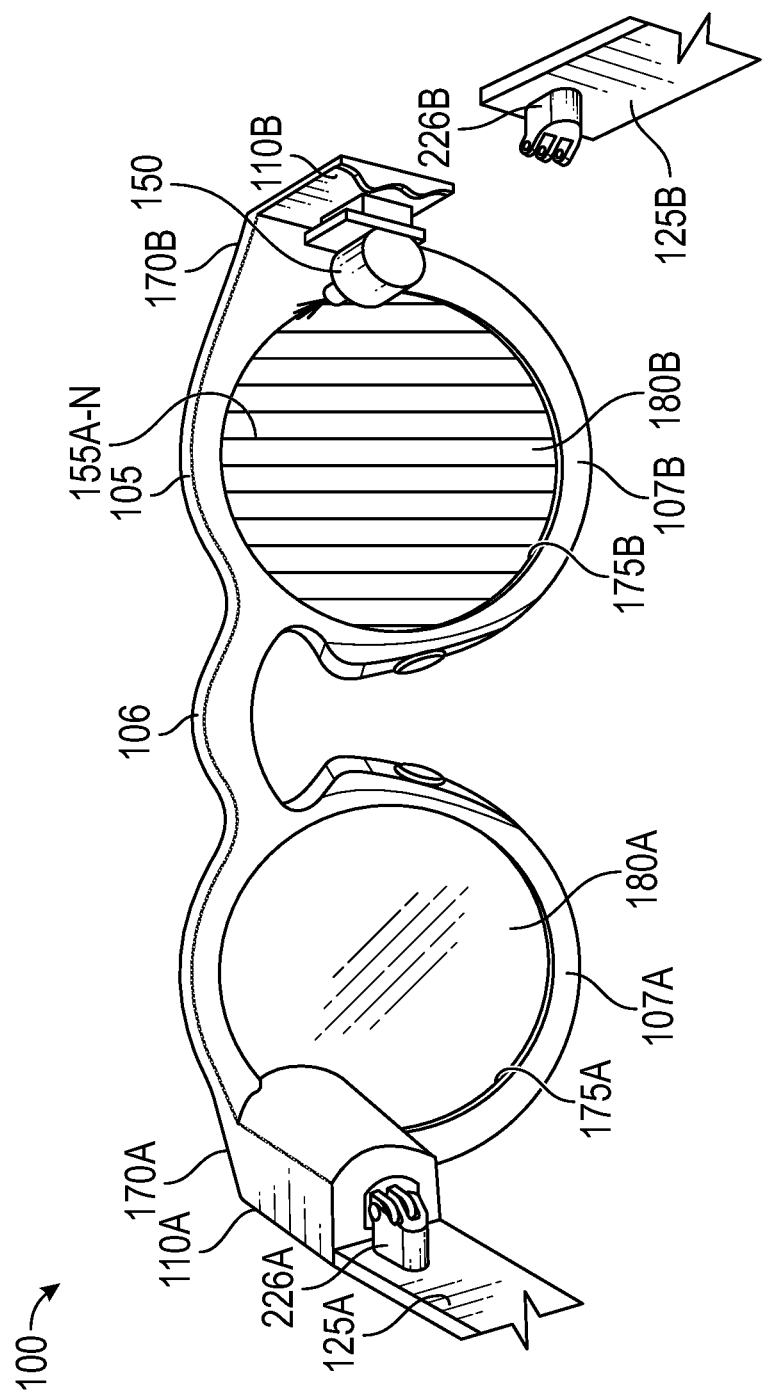

FIGS. 2C-D are rear views of example hardware configurations of the eyewear device 100, including two different types of see-through image displays. In one example, these see-through image displays of optical assembly 180A-B include an integrated image display. As shown in FIG. 2C, the optical assemblies 180A-B includes a suitable display matrix of any suitable type, such as a liquid crystal display (LCD), an organic light-emitting diode (OLED) display, a waveguide display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays, and the light travels through the prism so that the image viewed from the second surface is larger in one or more dimensions than the image emitted from the see-through image displays.

In another example, the see-through image displays of optical assembly 180A-B include a projection image display as shown in FIG. 2D. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into temples 125A-B attached to the frame 105.

In one example, the see-through image displays include the first see-through optical assembly 180A and the second see-through optical assembly 180B. Eyewear device 100 includes first and second apertures 175A-B which hold the respective first and second optical assembly 180A-B. The first optical assembly 180A includes the first see-through image display (e.g., a display matrix of FIG. 2C or optical strips 155A-N' and a projector 150). The second optical assembly 180B includes the second see-through image display (e.g., a display matrix of FIG. 2C or optical strips 155A-N" and a projector 150). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
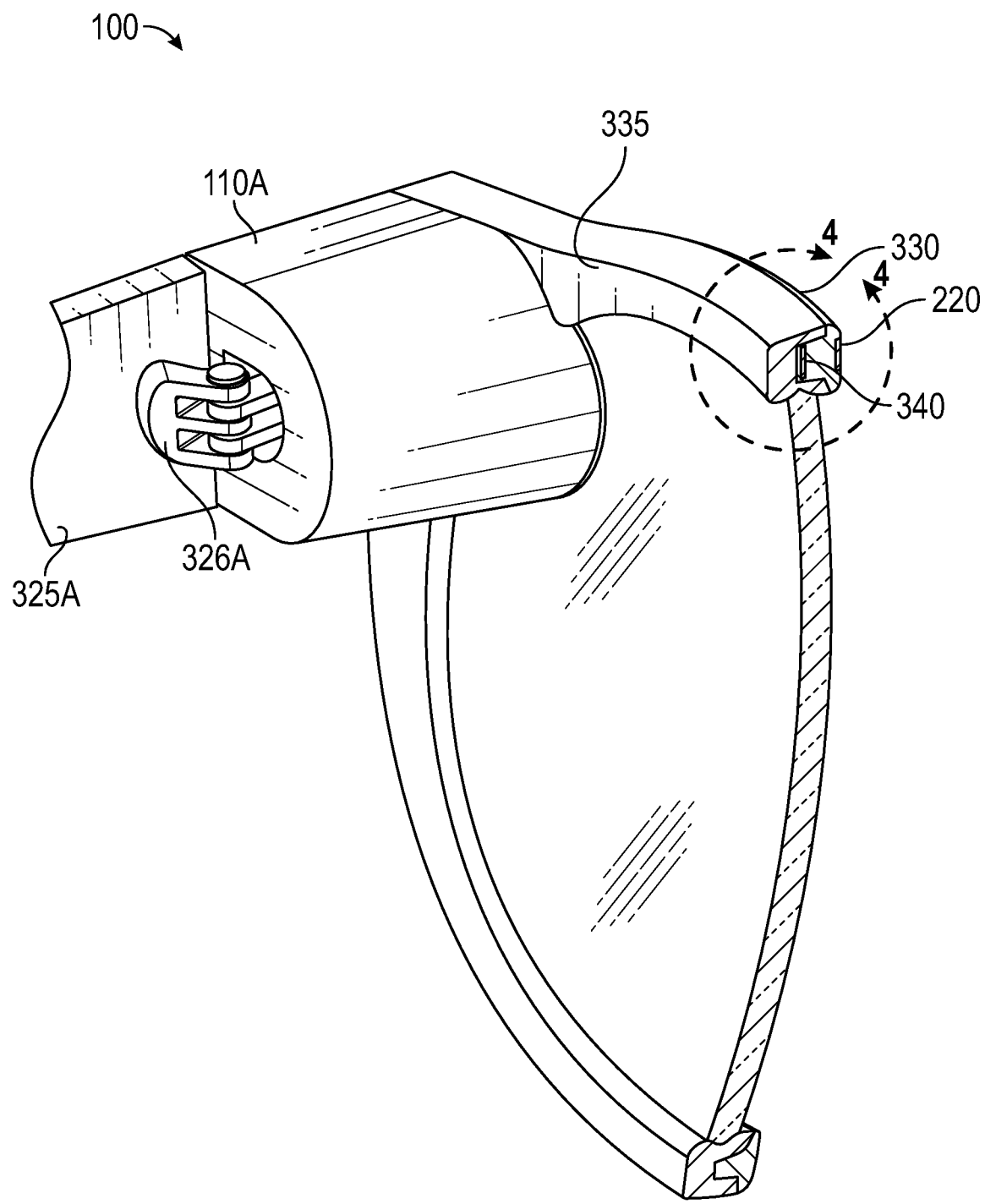
FIG. 3 shows a rear perspective view of the eyewear device of FIG. 2A depicting an infrared emitter, an infrared camera, a frame front, a frame back, and a circuit board.

FIG. 3 shows a rear perspective view of the eyewear device of FIG. 2A. The eyewear device 100 includes an infrared emitter 215, infrared camera 220, a frame front 330, a frame back 335, and a circuit board 340. It can be seen in FIG. 3 that the upper portion of the left rim of the frame of the eyewear device 100 includes the frame front 330 and the frame back 335. An opening for the infrared emitter 215 is formed on the frame back 335.

As shown in the encircled cross-section 4-4 in the upper middle portion of the left rim of the frame, a circuit board, which is a flexible PCB 340, is sandwiched between the frame front 330 and the frame back 335. Also shown in further detail is the attachment of the left temple 110A to the left temple 325A via the left hinge 326A. In some examples, components of the eye movement tracker 213, including the infrared emitter 215, the flexible PCB 340, or other electrical connectors or contacts may be located on the left temple 325A or the left hinge 326A.

Figure 4:
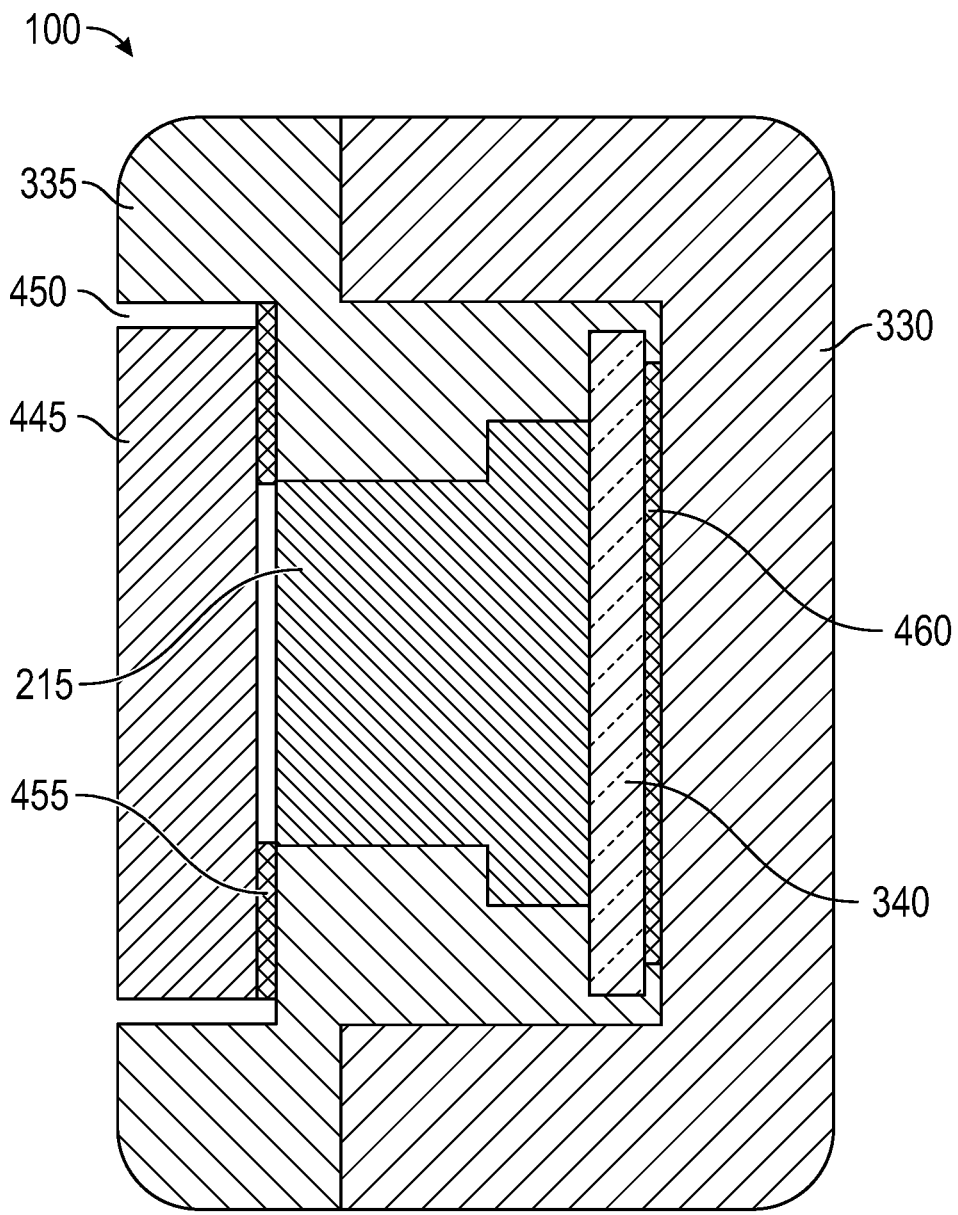
FIG. 4 is a cross-sectional view taken through the infrared emitter and the frame of the eyewear device of FIG. 3.

FIG. 4 is a cross-sectional view through the infrared emitter 215 and the frame corresponding to the encircled cross-section 4-4 of the eyewear device of FIG. 3. Multiple layers of the eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 5:
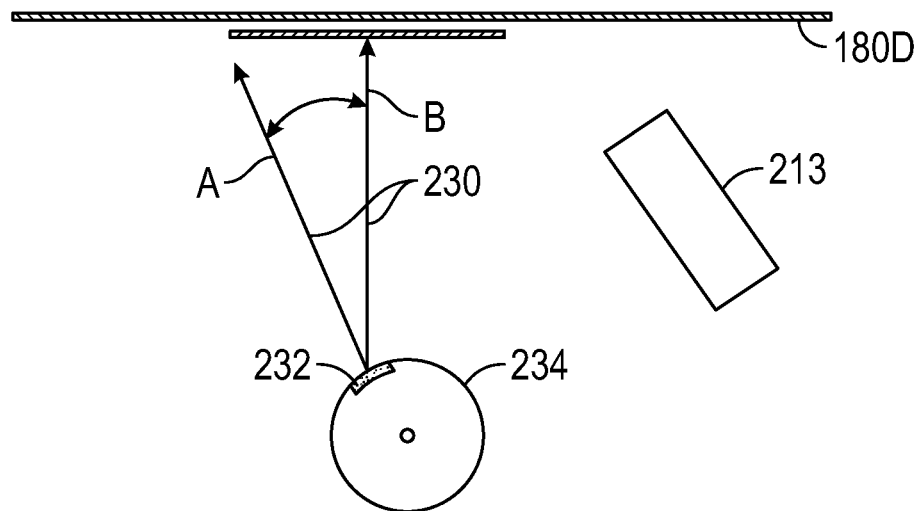
FIG. 5 illustrates detecting eye gaze direction.
Figure 6:
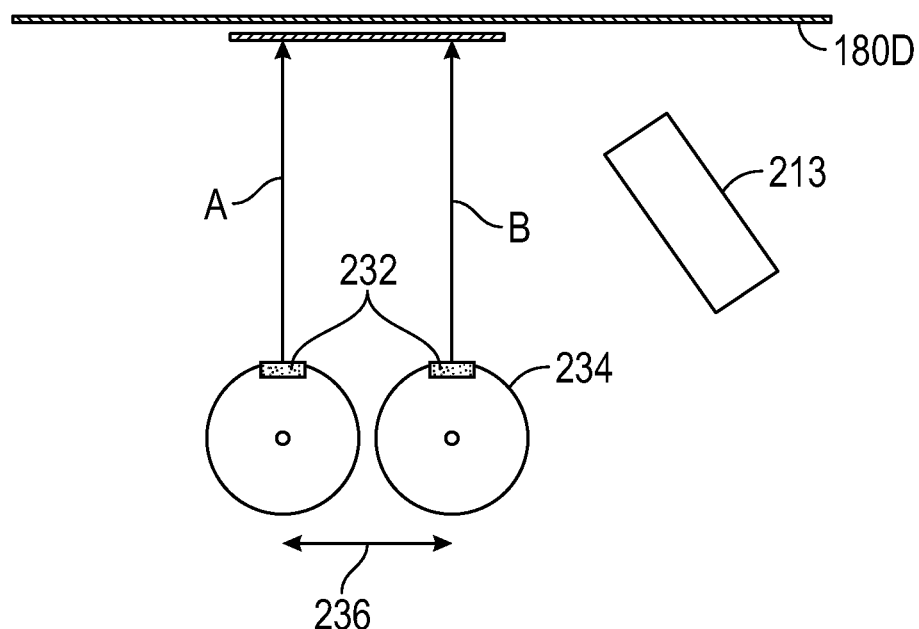
FIG. 6 illustrates detecting eye position.

In an example, the processor 932 utilizes eye tracker 213 to determine an eye gaze direction 230 of a wearer's eye 234 as shown in FIG. 5, and an eye position 236 of the wearer's eye 234 within an eyebox as shown in FIG. 6. The eye tracker 213 is a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to the see-through display 180D.

Figure 7:
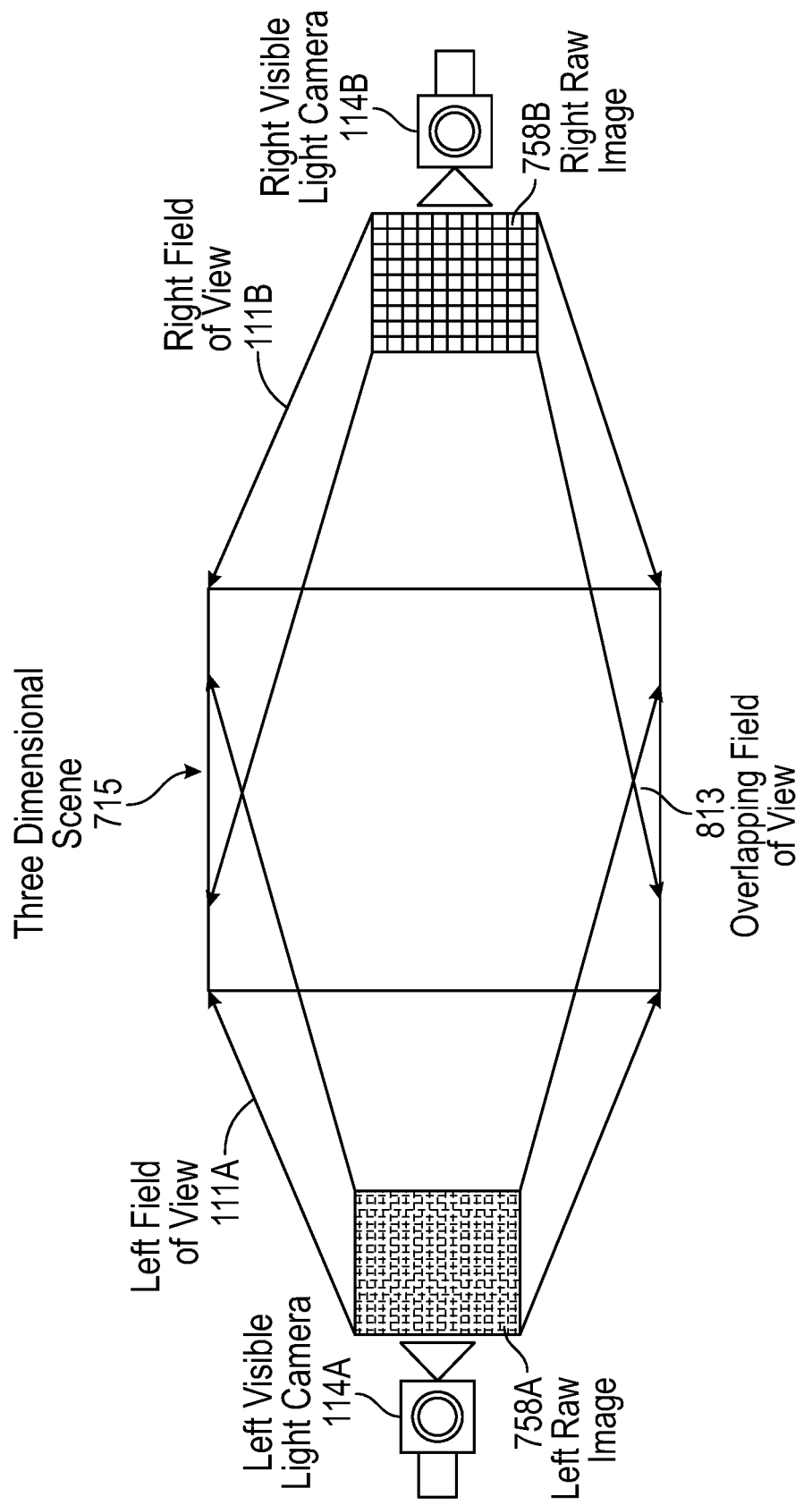
FIG. 7 depicts an example of visible light captured by the left visible light camera as a left raw image and visible light captured by the right visible light camera as a right raw image.

FIG. 7 depicts an example of capturing visible light with cameras. Visible light is captured by the left visible light camera 114A with a left visible light camera field of view 111A as a left raw image 758A. Visible light is captured by the right visible light camera 114B with a right visible light camera field of view 111B as a right raw image 758B. The processor 932 (FIG. 9) processes the left raw image 758A and the right raw image 758B to create a three-dimensional depth map 715 of a three-dimensional scene, referred to herein as an image frame. Depending on a camera capture mode, the processor 932 creates a still image frame, and also creates a series of image frames that make up a video clip 800, as shown in FIG. 8A.

Figure 8A:
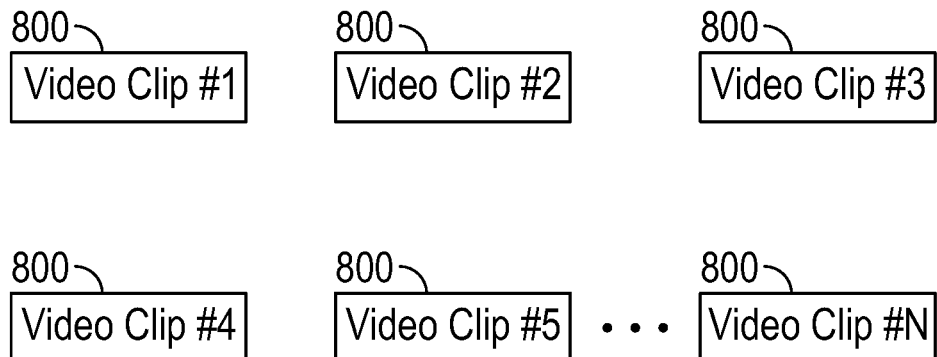
FIG. 8A illustrates a plurality of captured video clips.

FIG. 8A illustrates an example of a plurality of video clips 800 created by a user of eyewear 100/200. Each video clip 800 is created using the visible light cameras 114A-114B when the user uses eyewear 100/200 to capture images of the world about the user. Each video clip 800 is considered a raw video clip, meaning the video clip 800 is created from when the user enables the cameras 114A-B until the user disables the cameras, in an unedited form. These video clips 800 are automatically uploaded by processor 932 to the server system 998 over network 995 upon creation.

Figure 8B:
FIG. 8B illustrates a plurality of trimmed video clip segments.
Figure 9:
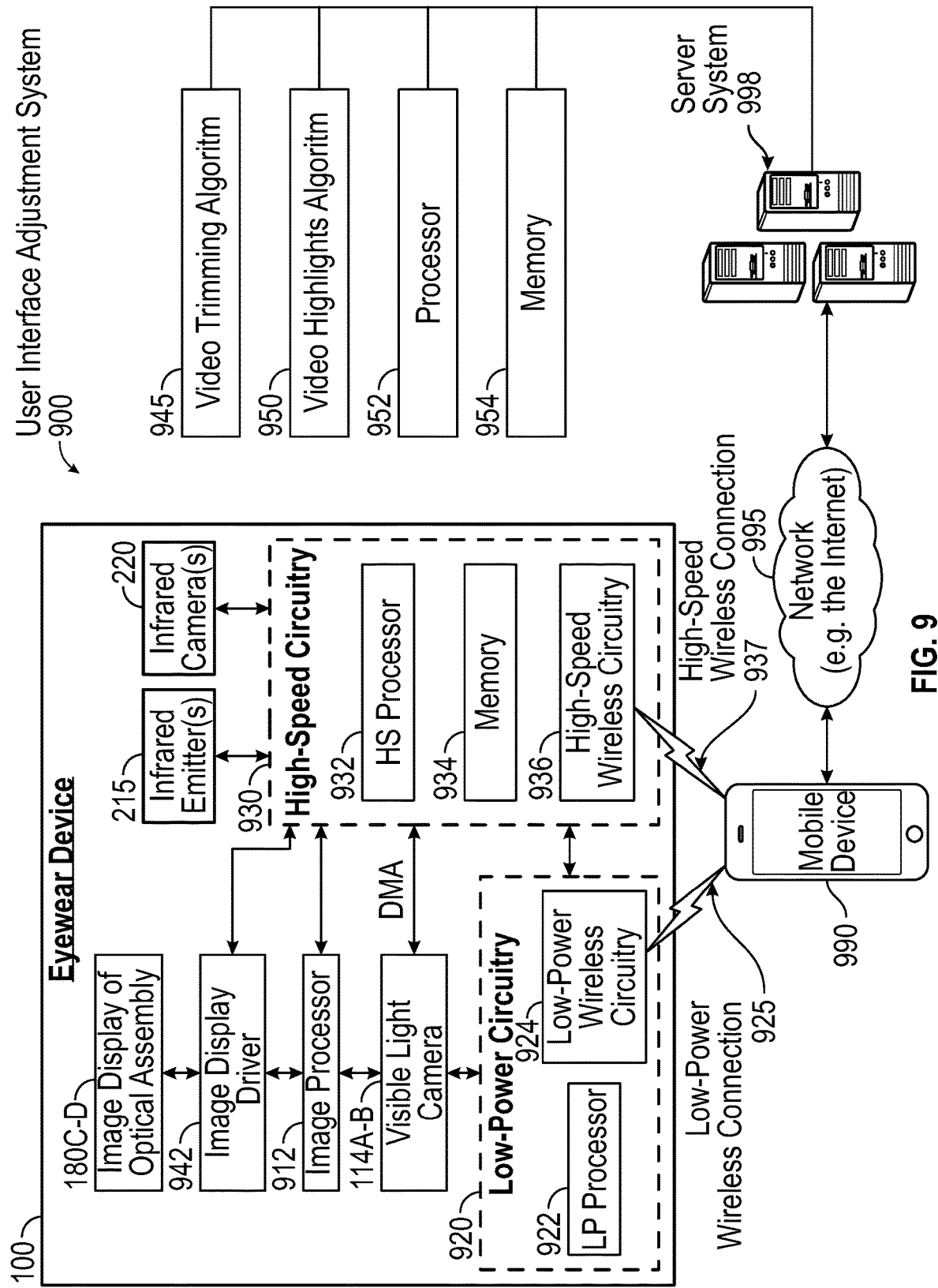
FIG. 9 illustrates a block diagram of electronic components of the eyewear device.

Referring to FIG. 8B, according to this disclosure, the raw video clips 800 are analyzed by a server processor 952 of the server system 998 and automatically trimmed to create trimmed video clip segments 802 using a video trimming algorithm 945 comprising computer executable instructions stored in server memory 954 (FIG. 9). As will be described in more detail with reference to FIG. 11, the server processor 952 using video trimming algorithm 945 gathers per-frame information about each of the video clips 800 using computer vision (CV) techniques that are commercially available and stored in server memory 954. The per-frame information includes several characteristics, such as the camera was obstructed or overexposed, the stability of segments in the video clip, segments contain pets, segments contain humans, human emotions, and human speech.

Based on a set of rules stored in server memory 954 and the gathered per-frame information, the server processor 952 automatically determines trim points and creates the trimmed video clip segments 802, referred to herein as auto editing. The segments of the video clip 800 that do not meet the set of rules are omitted by server processor 952 from the trimmed video clip segments 802. For example, the set of rules may be to include video segments that include a human and/or pet, and/or for video segments that have a specified object. The portions of a video clip 800 that does not include a human and/or pet are trimmed out of the raw video clip 800 to create the trimmed video clip segments 802.

Figure 8C:
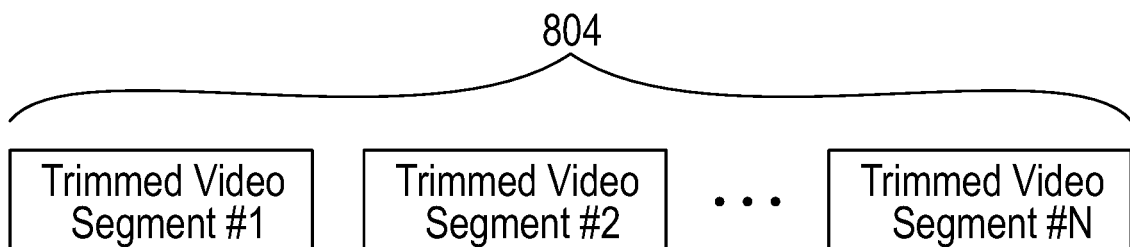
FIG. 8C illustrates video highlights generated from the trimmed video clip segments.

Referring to FIG. 8C, the server processor 952 then creates a summary from the trimmed video clip segments 802 using a video highlights algorithm 950 (FIG. 9), as will be described in more detail with reference to FIG. 10. The summary of the trimmed video clip segments 802 is a set that is less than all the trimmed video clip segments 802, and is a subset of the trimmed video clip segments 802. The summary of trimmed video clip segments 802 is referred to as video highlights 804. The video highlights algorithm 950 determines which of the trimmed video clip segments 802 are suitable to generate the video highlights 804, based on the number of trimmed video clip segments 802, their combined length in time, and other user determined variables. If a previous video highlights 804 already exists on the server system 998 that has not been permanently saved by a user of mobile device 995, it is deleted on the server system 998.

The video highlights 804 is downloaded by the server system 998 to the user of mobile device 990 for playback at a regular period, such as once a day in the evening. In one example, the combined length in time of the trimmed video clip segments 802 processed since the last generated video highlights 804 needs to meet a predetermined minimum time to generate a new video highlights 804, such as 2 minutes. Limitation to the time of day, frequency and length is not to be inferred in this disclosure, and these variables are provided as examples.

FIG. 9 depicts a high-level functional block diagram including example electronic components disposed in eyewear 100 and 200. The illustrated electronic components include the processor 932, and memory 934 which includes the instructions to implement functionality of eyewear 100/200. Processor 932 receives power from battery (not shown) and executes the instructions stored in memory 934, or integrated with the processor 932 on-chip, to perform functionality of eyewear 100/200, and communicating with external devices via wireless connections.

A user interface adjustment system 900 includes a wearable device, which is the eyewear device 100 with an eye movement tracker 213 (e.g., shown as infrared emitter 215 and infrared camera 220 in FIG. 2B). User interface adjustments system 900 also includes a mobile device 990 and a server system 998 connected via various networks. Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 includes at least two visible light cameras 114A-B (one associated with the left lateral side 170A and one associated with the right lateral side 170B). Eyewear device 100 further includes two see-through image displays 180C-D of the optical assembly 180A-B (one associated with the left lateral side 170A and one associated with the right lateral side 170B). The image displays 180C-D are optional in this disclosure. Eyewear device 100 also includes image display driver 942, image processor 912, low-power circuitry 920, and high-speed circuitry 930. The components shown in FIG. 9 for the eyewear device 100 are located on one or more circuit boards, for example a PCB or flexible PCB, in the temples. Alternatively, or additionally, the depicted components can be located in the temples, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 945 implements the user interface field of view adjustment instructions, including, to cause the eyewear device 100 to track, via the eye movement tracker 213, the eye movement of the eye of the user of the eyewear device 100. Other implemented instructions (functions) cause the eyewear device 100 to determine, a field of view adjustment to the initial field of view of an initial displayed image based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 934 to present the sequence of displayed images, including the initial displayed image with the initial field of view and the successive displayed image with the successive field of view.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays 180C-D of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, color maps, camera data generated by the left and right visible light cameras 114A-B and the image processor 912, as well as images generated for display by the image display driver 942 on the see-through image displays 180C-D of the optical assembly 180A-B. While memory 934 is shown as integrated with high-speed circuitry 930, in other examples, memory 934 may be an independent stand-alone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that includes a processor 952, a memory 954, and network communication interface to communicate over the network 995 with the mobile device 990 and eyewear device 100 and 200. Eyewear device 100 and 200 is connected with a host computer. For example, the eyewear device 100 and 200 is paired with the mobile device 990 via the high-speed wireless connection 937 or connected to the server system 998 via the network 995.

Output components of the eyewear device 100 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, the peripheral device elements may include any I/O components including output components, motion components, position components, or any other such elements described herein.

For example, the biometric components of the user interface field of view adjustment 900 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some examples, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third-party application can invoke API calls provided by the operating system to facilitate functionality described herein.

Figure 10:
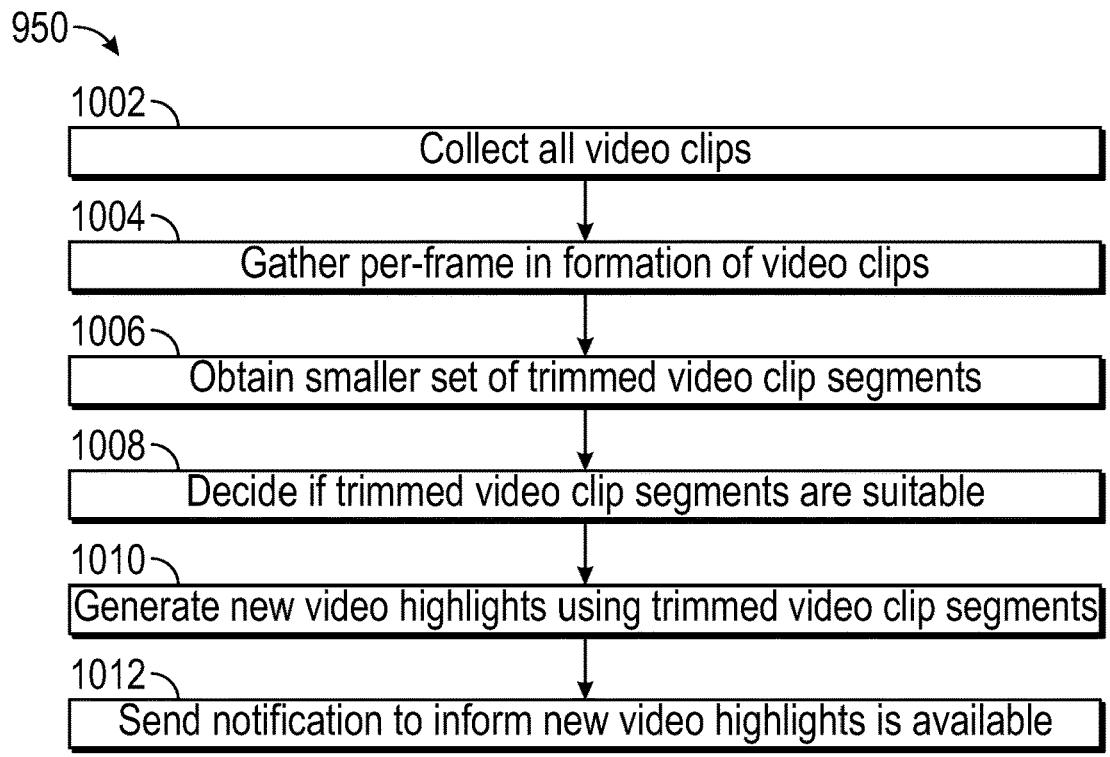
FIG. 10 is a flowchart of the operation of creating video highlights from trimmed video clip segments.

FIG. 10 is a flowchart of the video highlights algorithm 950 illustrating the operation of the server system 998 upon receiving uploaded video clips 800 from eyewear device 100/200, created by the high-speed processor 952 executing instructions stored in memory 954, to create the video highlights 804. Although shown as occurring serially, the blocks of FIG. 10 may be reordered or parallelized depending on the implementation. If a previous video highlights 804 already exists on the server system 998 that has not been permanently saved by a user of mobile device 995, it is deleted on the server system 998.

Blocks 1002-1010 are performed by processor 952 implementing the video highlights algorithm 950.

At block 1002, the processor 952 collects video clips 800 over network 995 from the eyewear 100/200 using the cameras 114A-B as previously described with reference to FIG. 7 and FIG. 8A. The eyewear 100/200 automatically uploads all captured video clips 800 to the server system 998 upon creation. The plurality of video clips 800 are stored in memory 954 and are a set of raw unedited video clips as discussed and shown in FIG. 8A. The set of video clips 800 are created and stored since a last video highlights was created. In one example, a video highlights 804 is created periodically, such as every 24 hours at a set time, such as from a set time of 8 pm each day.

At block 1004, the server processor 952 using video trimming algorithm 945 gathers per-frame information about each of the video clips 800 using computer vision (CV) techniques that are commercially available and stored in server memory 954. The per-frame information includes several characteristics, such as the camera was obstructed or overexposed, the stability of segments in the video clip, segments contain pets, segments contain humans, human emotions, and human speech.

At block 1006, based on a set of rules stored in server memory 954 and the gathered per-frame information, the server processor 952 automatically determines trim points and creates the trimmed video clip segments 802 (FIG. 8B), referred to herein as auto editing. The segments of the video clip 800 that do not meet the set of rules are omitted by server processor 952 from the trimmed video clip segments 802. For example, the set of rules may be to include video segments that include a human and/or pet, and/or for video segments that have a specified object. The portions of a video clip 800 that does not include a human and/or pet are trimmed out of the raw video clip 800 to create the trimmed video clip segments 802.

At block 1008, the processor 952 decides if the trimmed video clip segments 802 are suitable to generate the video highlights 804, such as based on the number of the video clip segments 802, such as five, and their combined length in time. If the combined length of time is greater than a predetermined time limit, such as 5 or 10 minutes for example, the processor 952 compares the trimmed video clip segments 802 to remove similar segments. If the combined length of time is still greater than the predetermined limit, the processor will continue to remove trimmed video clip segments 802 based on a similarity score created by the processor 952. For instance, the processor 952 can compare two trimmed video clips 802 having a high degree of similarity and retaining the trimmed video clip having a higher quality and/or a shorter duration, remove frames within video clips without affecting context, and iterating this process until the desired length is achieved. Not all of the trimmed video clip segments 802 may be included in the video highlights 804.

At block 1010, the processor 952 generates the video highlights 804 based on the remaining trimmed video clip segments from block 1006 as shown in FIG. 8C. The video highlights 804 is stored in memory 934.

At block 1012, the processor 952 generates a notification indicative that the video highlights 804 is ready. The notification is sent to a user's mobile device 990 via the network 995 as shown in FIG. 9. The user can then download and view the video highlights 804 as will be discussed with respect to FIG. 12 shortly.

Figure 11:
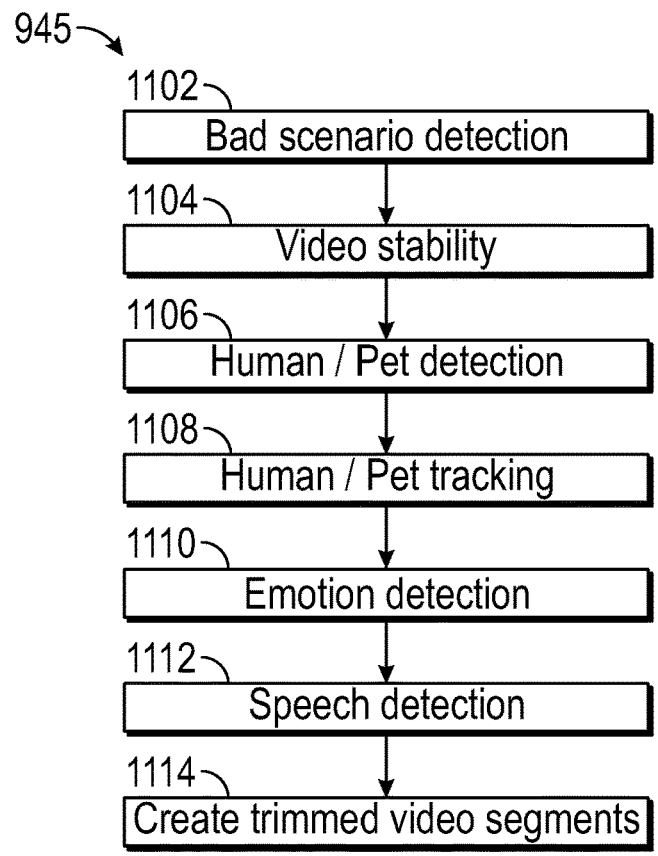
FIG. 11 is a flowchart of the operation of creating a summary of trimmed video clip segments.

Referring now to FIG. 11, there is shown the video trimming algorithm 945 performed by the processor 952 on each of the video clips 800 using CV techniques as discussed with respect to block 1004 of FIG. 10. This video trimming algorithm 945 processes each of the video clips 800 to ascertain characteristics of the video clips 800, such as to identify frames and segments of the video clips 800 that have certain characteristics. This information is used by the processor 952 to automatically create the trimmed video clip segments 802, and the video highlights 804.

At block 1102, the processor 952 performs a bad scenario detection on each of the video clips 800. This detection detects if camera 114A and/or camera 114B was partially or totally obstructed or overexposed during capture of frames, and flags those video clips 800 to be removed from the video highlights 804.

At block 1104, a video stability detection is performed by processor 952. Processor 952 searches for stable (slow/no moving of camera) segments of the video clips 800.

At block 1106, the processor 952 performs human/pet detection. This detection finds segments of video clips 800 containing a human or pet. This detection can also be done for any other interesting objects, such as cars, planes, buildings, etc.

At block 1108, the processor 952 performs human/pet tracking. This detection determines if an object detected in each video clip segment is the center of attention of the video clip 800.

At block 1110, the processor 952 performs emotion detection. The processor 952 finds segments of the video clip 800 that contains a human emotion, such as a smile.

At block 1112, the processor 952 performs speech detection. The processor 952 searches for segments of the video clips 800 with human speech. This helps avoid trimming the middle of a video clip 800 in the middle of a sentence or word.

At block 1114, the processor 952 creates the trimmed video clip segments 802 based on the set of rules, such as segments that satisfy the detection of blocks 1002-1012. The trimmed video clips 802 that meet the set of rules are the clips 802 that are the video highlights 804.

Figure 12:
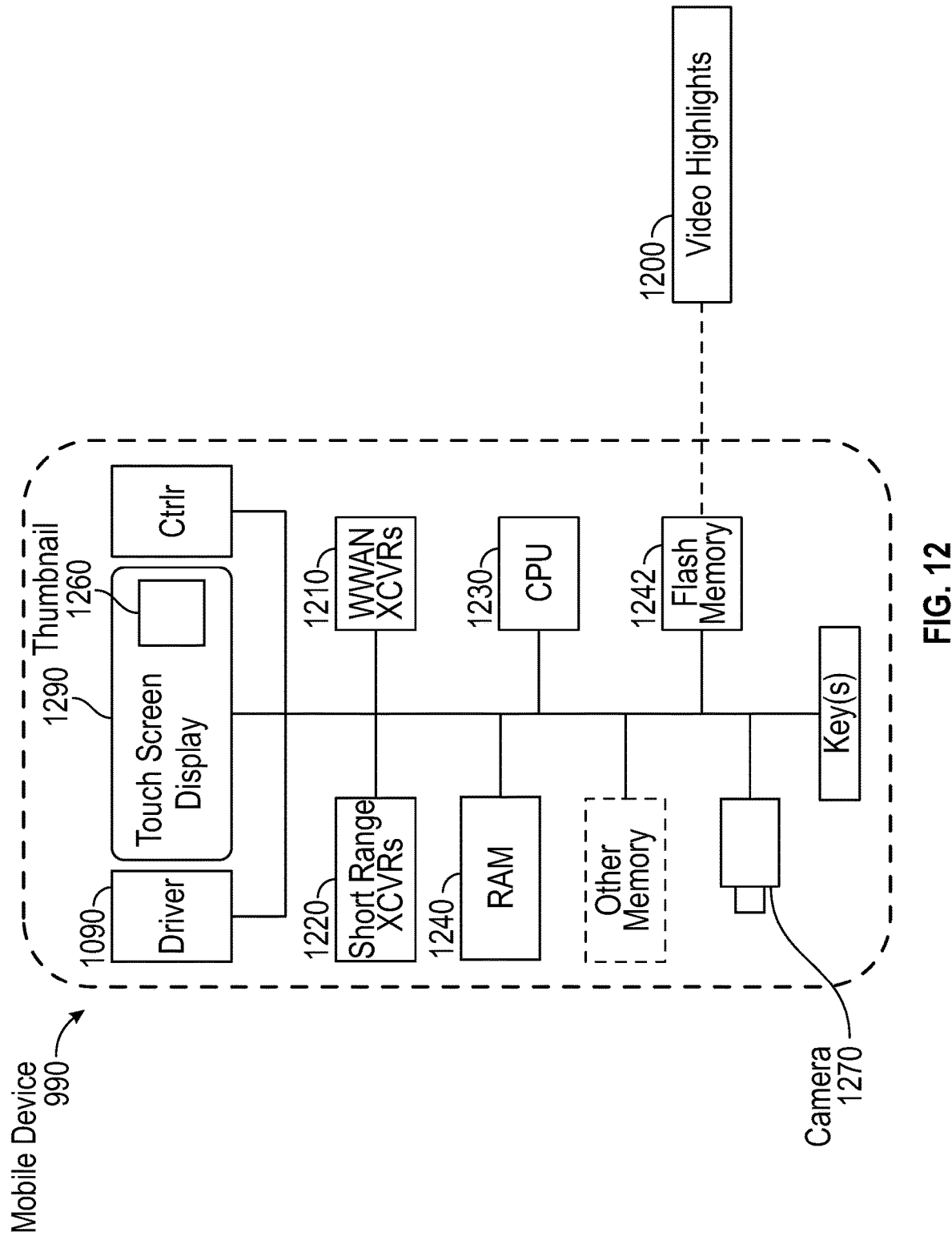
FIG. 12 is a functional block diagram of a mobile device.

FIG. 12 is a high-level functional block diagram of an example mobile device 990 that communicates via network 995 with server system 998 of FIG. 9. Shown are elements of a touch screen type mobile device 990 having video highlights editing algorithm 1200, although other non-touch type mobile devices can be used under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example, and the subject technology as described herein is not intended to be limited thereto. For purposes of this discussion, FIG. 12 therefore provides a block diagram illustration of the example mobile device 990 having a touch screen display 1290 for displaying content and receiving user input as (or as part of) the user interface. Mobile device 990 also includes a camera(s) 1270, such as visible light camera(s).

As shown in FIG. 12, the mobile device 990 includes at least one digital transceiver (XCVR) 1210, shown as WWAN XCVRs, for digital wireless communications via a wide area wireless mobile communication network 995. The mobile device 990 also includes additional digital or analog transceivers, such as short range XCVRs 1220 for short-range network communication, such as via NFC, VLC, DECT, ZigBee, Bluetooth™, or WiFi. For example, short range XCVRs 1220 may take the form of any available two-way wireless local area network (WLAN) transceiver of a type that is compatible with one or more standard protocols of communication implemented in wireless local area networks, such as one of the Wi-Fi standards under IEEE 802.11 and 4G LTE.

To generate location coordinates for positioning of the mobile device 990, the mobile device 990 can include a global positioning system (GPS) receiver. Alternatively, or additionally the mobile device 990 can utilize either or both the short range XCVRs 1220 and WWAN XCVRs 1210 for generating location coordinates for positioning. For example, cellular network, WiFi, or Bluetooth™ based positioning systems can generate very accurate location coordinates, particularly when used in combination. Such location coordinates can be transmitted to the eyewear device 100/200 over one or more network connections via XCVRs 1220.

The transceivers 1210, 1220 (network communication interface) conforms to one or more of the various digital wireless communication standards utilized by modern mobile networks. Examples of WWAN transceivers 1210 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1210, 1220 provide two-way wireless communication of information including digitized audio signals, still image and video signals, web page information for display as well as web related inputs, and various types of mobile message communications to/from the mobile device 990 for user identification strategies.

Several of these types of communications through the transceivers 1210, 1220 and network 995, as discussed previously, relate to protocols and procedures in support of communications with the server system 998. Such communications, for example, may transport packet data via the short range XCVRs 1220 over the wireless connections of network 995 to and from the server system 998 as shown in FIG. 9. Such communications, for example, may also transport data utilizing IP packet data transport via the WWAN XCVRs 1210 over the network (e.g., Internet) 995 shown in FIG. 9. Both WWAN XCVRs 1210 and short range XCVRs 1220 connect through radio frequency (RF) send-and-receive amplifiers (not shown) to an associated antenna (not shown).

The mobile device 990 further includes a microprocessor 1230, shown as a CPU, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1230, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1230 or processor hardware in smartphone, laptop computer, and tablet.

The microprocessor 1230 serves as a programmable host controller for the mobile device 990 by configuring the mobile device to perform various operations, for example, in accordance with instructions or programming executable by processor 1230. For example, such operations may include various general operations of the mobile device, as well as operations related to performance metric monitoring, reporting to server system 998, and gating. Although a processor may be configured by use of hardwired logic, typical processors in mobile devices are general processing circuits configured by execution of programming.

The mobile device 990 includes a memory or storage device system, for storing data and programming. In the example, the memory system may include a flash memory 1242 and a random access memory (RAM) 1240. The RAM 1240 serves as short term storage for instructions and data being handled by the processor 1230, e.g. as a working data processing memory. The flash memory 1242 typically provides longer term storage.

Hence, in the example of mobile device 990, the flash memory 1242 is used to store programming or instructions for execution by the processor 1230. Depending on the type of device, the mobile device 990 stores and runs a mobile operating system through which specific applications. Applications, such as video highlights editing 1200, may be a native application, a hybrid application, or a web application (e.g., a dynamic web page executed by a web browser) that runs on mobile device 990 to uniquely identify the user. Examples of mobile operating systems include Google Android®, Apple iOS® (I-Phone or iPad devices), Windows Mobile®, Amazon Fire OS®, RIM BlackBerry® operating system, or the like.

Figure 13:
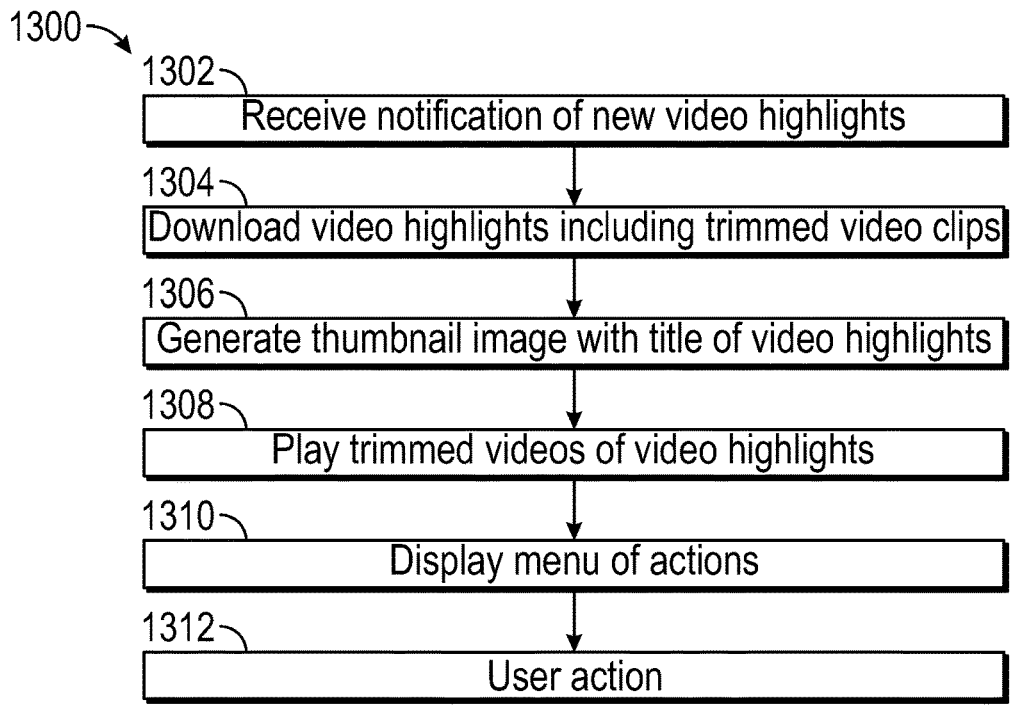
FIG. 13 is a flowchart of a mobile device receiving and processing video highlights with automated trimming of video clips.

Referring to FIG. 13, there is shown a device algorithm 1300 performed by processor 1230 of mobile device 990.

At block 1302, when the mobile device 990 receives a notification as discussed with respect to block 1010 of FIG. 10 from the server system 998 that a new video highlights 804 is available, at block 1304 the mobile device 990 automatically downloads the trimmed video clip segments 802 of video highlights 804 over the network 995 and stores them in memory, such as RAM 1240, of mobile device 995.

At block 1306, after completing the download of the trimmed video clip segments 802 of video highlights 804, the processor 1230 responsively displays a thumbnail image 1260 indicative of the downloaded trimmed video clip segments 802 comprising video highlights 804 on touch screen display 1290 with the title (e.g. the date) of the video highlights 804. These trimmed video clip segments 802 of video highlights 804 are stored in memory, such as RAM 1240.

At block 1308, when the user taps on the thumbnail 1260, the trimmed video clip segments 802 responsively begin to play back in order on display 1290. The trimmed video clip segments 802 will play in order until the last one plays. The user can pause the playback by touching the display 1290, and can resume playback by touching the display again.

At block 1310, if the user performs a long press on the displayed thumbnail 1260, or taps on an options disclosure icon displayed on display 1290, a menu of actions is displayed on display 1290. The user will have options to perform.

At block 1312, tapping on items in the menu allows the user to permanently save the video highlights 804 into memory, such as flash memory 1242 on the mobile device 990 or to the cloud. The user can also send the video highlights 804 to other users, and delete the video highlights 804. The video highlights 804 is automatically save for a predetermined period of time, such as three days. This time period can be set/edited by the user.

User Editing

In another example, the user can edit the exact trim points of selected video clips 800 that are determined by processor 952 to have certain characteristics, such as shown and discussed with respect to FIG. 11. Thus, rather than processor 952 automatically determining the trim points of the trimmed video clip segments 802, the server system 998 downloads the untrimmed video clips 800 as video highlights 804 that are determined by processor 952 to have the certain characteristics to mobile device 995. This allows the user to custom create the trimmed video clip segments 802 in video highlights 804, such as to later use in music, title cards, etc.

Figure 14:
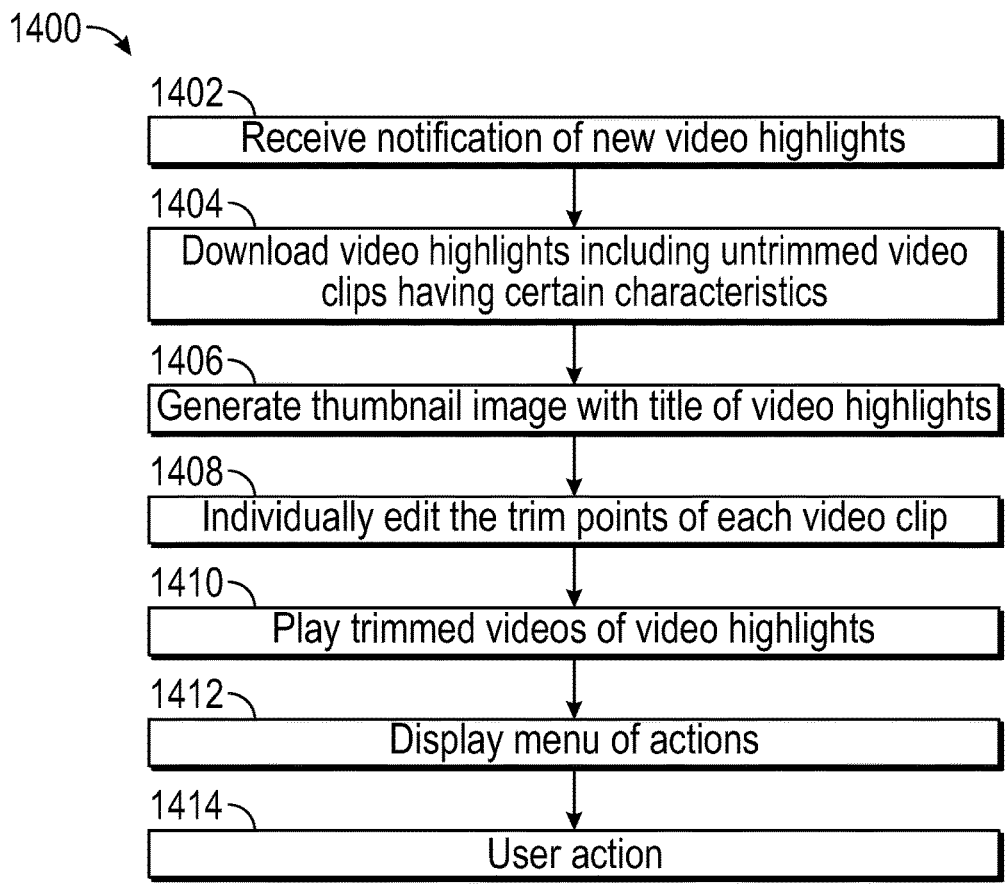
FIG. 14 is a flowchart of a mobile device receiving and processing video highlights with customized manual trimming of video clips.

Referring to FIG. 14, there is shown an algorithm 1400 performed by processor 1230 of mobile device 990.

At block 1402, when the mobile device 990 receives a notification as discussed with respect to block 1010 of FIG. 10 from the server system 998 that a new video highlights 804 with selected untrimmed video clips 800 having certain characteristics is available, at block 1404 the mobile device 990 automatically downloads the selected video clips 800 of video highlights 804 over the network 995 and stores them in memory, such as RAM 1240, of mobile device 995.

At block 1406, after completing the download of the selected untrimmed video clips 800 of video highlights 804, the processor 1230 responsively displays a thumbnail image 1260 indicative of the downloaded untrimmed video clips 800 comprising video highlights 804 on touch screen display 1290 with the title (e.g. the date) of the video highlights 804. These untrimmed video clips 800 of video highlights 804 are stored in memory, such as RAM 1240.

At block 1408, when the user taps on the thumbnail 1260, the untrimmed video clips 800 are displayed on display 1290 and can be individually selected by the user and trimmed as desired to create trimmed video clip segments 802 using displayed edit features. Thus, the video highlights 804 now includes the user trimmed video clip segments 802.

At block 1410, the trimmed video clip segments 802 of video highlights 804 can be selected to play in order until the last one plays. The user can pause the playback by touching the display 1290, and can resume playback by touching the display again.

At block 1412, if the user performs a long press on the displayed thumbnail 1260, or taps on an options disclosure icon displayed on display 1290, a menu of actions is displayed on display 1290. The user will have options to perform.

At block 1414, tapping on items in the menu allows the user to permanently save the video highlights 804 into memory, such as flash memory 1242 on the mobile device 990 or to the cloud. The user can also send the video highlights 804 to other users, and delete the video highlights 804. The video highlights 804 is automatically save for a predetermined period of time, such as three days. This time period can be set/edited by the user.

Video Highlight User Signals

A behind-the-scenes feature enhancement allows the video highlights algorithm to get smarter and more dynamic over time on a per-user basis. User engagement is tracked to better determine which video clips are the highest value to a user. Signals are added to help curate video highlights in memory, and include Highlight, View, Post, Send, Export, and Edit.

If a user manually highlights a video clip, this is tracked as a Highlight action.

If a user manually views a video clip, individually, either from an individual thumbnail or from a thumbnail in an expanded video highlights, this is traced as an Individual View.

If a user posts a single video clip to their video highlights, this is tracked as a Post action.

If a user shares a single video clip with a friend, this is tracked as a Send action.

If a user exports a video clip, this is tracked as an Export action.

If a user adds an edit to a video clip, this is tracked as an Edit item.

In one example, a counter is incremented each time a video clip is viewed, posted, or sent. Video clips having a higher count are given preference during trimming over other video clips. Different actions may have different weightings—viewing may be a 1, posting may be a 2, and sending may be a 3.

In another example, posted video clips are analyzed to determine characteristics, e.g., animals. Video clips having animals are given preference during trimming.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A server having an electronic processor, the processor configured to execute computer instructions to:
   track a number of user interactions with video clips on a mobile device, wherein the user interactions include using the mobile device to at least one of view, post, send, trim or export the video clips;
   receive a plurality of video clips each comprised of video frames from the mobile device periodically;
   process the video frames of the plurality of video clips on a per-frame basis to identify one or more characteristics in the video frames of the plurality of video clips, the one or more characteristics comprising whether the video frames contain pets, humans, human speech, human emotions, or a specified object;
   automatically trim the plurality of processed video clips at the server to create a set of trimmed video clip segments based on a set of rules and the identified characteristics whereby video clip segments that do not satisfy the rules and that have not been permanently saved by a user of the mobile device are omitted from the trimmed video clip segments, the rules specifying at least the inclusion of video clip segments that include at least one of a human, a pet, or the specified object, wherein a first video clip segment having a higher number of user interactions is given preference over a second video clip segment having a lower number of user interactions for inclusion in the set of trimmed video clip segments;

compare the trimmed video clip segments to each other based on a similarity score of the video frames having the identified characteristics to remove similar video clip segments having similar video frames and generating a reduced set of trimmed video clip segments having the identified characteristics;

create video highlights from the reduced set of trimmed video clip segments; and send to the mobile device the video highlights created from the reduced set of trimmed video clip segments having the identified characteristics received from the mobile device periodically.

2. The server as specified in claim 1, wherein the mobile device is eyewear.

3. The server as specified in claim 1, further comprising omitting from the set of trimmed video clip segments a video clip segment that is indicative that a camera that captured the video clip segment was partially or totally obstructed or overexposed during capture.

4. The server as specified in claim 1, wherein the reduced set of trimmed video clip segments comprise a subset of the received plurality of video clips that is less than all of the received plurality of video clips.

5. The server as specified in claim 1, wherein the reduced set of trimmed video clips has a combined length of time below a predetermined limit.

6. The server as specified in claim 5, wherein the processor is configured to send the reduced set of trimmed video clip segments to the mobile device periodically.

7. The server as specified in claim 1, wherein the processor is configured to use computer vision (CV) to process the video frames of the plurality of video clips on a per-frame basis to identify the one or more characteristics in the video frames of the plurality of video clips.

8. A method of using a server having an electronic processor and computer instructions to provide video highlights, the processor:

tracking a number of user interactions with video clips on a mobile device, wherein the user interactions include using the mobile device to at least one of view, post, send, trim or export the video clips;

receiving a plurality of video clips each comprised of video frames from a mobile device periodically;

processing the video frames of the plurality of video clips on a per-frame basis to identify one or more characteristics in the video frames of the plurality of video clips, the one or more characteristics comprising whether the video frames contain pets, humans, human speech, human emotions, or a specified object;

automatically trimming the plurality of processed video clips at the server to create a set of trimmed video clip segments based on a set of rules and the identified characteristics whereby video clip segments that do not satisfy the rules and that have not been permanently saved by a user of the mobile device are omitted from the trimmed video clip segments, the rules specifying at least the inclusion of video clip segments that include at least one of a human, a pet, or the specified object, wherein a first video clip segment having a higher number of user interactions is given preference over a second video clip segment having a lower number of user interactions for inclusion in the set of trimmed video clip segments;

comparing the trimmed video clip segments to each other based on a similarity score of the video frames having the identified characteristics to remove similar video clip segments having similar video frames and generate a reduced set of trimmed video clip segments having the identified characteristics;

creating video highlights from the reduced set of trimmed video clip segments; and sending to the mobile device the video highlights created from the reduced set of trimmed video clip segments having the identified characteristics received from the mobile device periodically.

9. The method of claim 8, wherein the user interactions have different weightings and the first video clip segment is given preference over the second video clip segment if a total weighting of user interactions with the first video clip segment exceeds a total weighting of user interactions with the second video clip segment.

10. The method of claim 8, further comprising omitting from the set of trimmed video clip segments a video clip segment that is indicative that a camera that captured the video clip segment was partially or totally obstructed or overexposed during capture.

11. The method as specified in claim 8, wherein the reduced set of trimmed video clip segments comprise a subset of the received plurality of video clips that is less than all of the received plurality of video clips.

12. The method as specified in claim 8, wherein the reduced set of trimmed video clips has a combined length of time below a predetermined limit.

13. The method as specified in claim 8, further comprising the processor using computer vision (CV) to process the video frames of the plurality of video clips on a per-frame basis to identify the one or more characteristics in the video frames of the plurality of video clips.

14. The method as specified in claim 8, further comprising the processor sending the reduced set of trimmed video clip segments to the mobile device periodically.

15. A non-transitory computer-readable medium storing program code which, when executed, is operative to cause a computing device to perform the steps of:

tracking a number of user interactions with video clips on a mobile device, wherein the user interactions include using the mobile device to at least one of view, post, send, trim or export the video clips;

receiving a plurality of video clips each comprised of video frames from a mobile device periodically;

processing the video frames of the plurality of video clips on a per-frame basis to identify one or more characteristics in the video frames of the plurality of video clips, the one or more characteristics comprising whether the video frames contain pets, humans, human speech, human emotions, or a specified object;

automatically trimming the plurality of processed video clips at a server to create a set of trimmed video clip segments based on a set of rules and the identified characteristics whereby video clip segments that do not satisfy the rules and that have not been permanently saved by a user of the mobile device are omitted from the trimmed video clip segments, the rules specifying at least the inclusion of video clip segments that include at least one of a human, a pet, or the specified object, wherein a first video clip segment having a higher number of user interactions is given preference over a second video clip segment having a lower number of user interactions for inclusion in the set of trimmed video clip segments;

comparing the trimmed video clip segments to each other based on a similarity score of the video frames having the identified characteristics to remove similar video clip segments having similar video frames and generate a reduced set of trimmed video clip segments having the identified characteristics;

creating video highlights from the reduced set of trimmed video clip segments; and sending to the mobile device the video highlights created from the reduced set of trimmed video clip segments having the identified characteristics received from the mobile device periodically.

16. The non-transitory computer readable medium as specified in claim 15, wherein video clip segments including an animal are given preference during the trimming to create the set of trimmed video clip segments.

17. The non-transitory computer readable medium as specified in claim 15, further comprising omitting from the set of trimmed video clip segments a video clip segment that is indicative that a camera that captured the video clip segment was partially or totally obstructed or overexposed during capture.

18. The non-transitory computer readable medium as specified in claim 15, wherein the reduced set of trimmed video clip segments comprise a subset of the received plurality of video clips that is less than all of the received plurality of video clips.

19. The non-transitory computer readable medium as specified in claim 18, wherein the reduced set of trimmed video clips has a combined length of time below a predetermined limit.

20. The non-transitory computer readable medium as specified in claim 15, further including instructions for using computer vision (CV) to process the video frames of the plurality of video clips on a per-frame basis to identify the one or more characteristics in the video frames of the plurality of video clips.

\* \* \* \* \*